United States Patent
Gonzalez et al.

(10) Patent No.: US 11,305,457 B2
(45) Date of Patent: Apr. 19, 2022

(54) PRESSURE CASTING OF SUBMICRON CERAMIC PARTICLES AND METHODS OF EJECTION

(71) Applicant: James R. Glidewell Dental Ceramics, Inc., Newport Beach, CA (US)

(72) Inventors: Hugo Gonzalez, Whittier, CA (US); Sreeram Balasubramanian, Irvine, CA (US); Mathew David Campbell, Tustin, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

(21) Appl. No.: 16/862,645

(22) Filed: Apr. 30, 2020

(65) Prior Publication Data

US 2020/0346366 A1 Nov. 5, 2020

Related U.S. Application Data

(60) Provisional application No. 62/842,580, filed on May 3, 2019.

(51) Int. Cl.
*B28B 1/00* (2006.01)
*B28B 1/26* (2006.01)

(52) U.S. Cl.
CPC .............. *B28B 1/265* (2013.01); *B28B 1/261* (2013.01)

(58) Field of Classification Search
CPC ................................ B28B 1/265; B28B 1/261
See application file for complete search history.

(56) References Cited

U.S. PATENT DOCUMENTS

| | | | |
|---|---|---|---|
| 399,064 A * | 3/1889 | McLean | |
| 4,913,640 A * | 4/1990 | Spieler | B28B 1/266 249/120 |
| 4,913,868 A * | 4/1990 | Ito | B28B 1/261 264/135 |
| 5,083,911 A | 1/1992 | Hisaeda et al. | |
| 5,156,856 A * | 10/1992 | Iwasaki | B28B 1/261 249/113 |
| 5,167,271 A | 12/1992 | Lange et al. | |
| 5,296,175 A | 3/1994 | Iwasaki et al. | |
| 5,336,282 A * | 8/1994 | Ghosh | C04B 35/486 501/103 |
| 5,427,722 A * | 6/1995 | Fouts | B28B 1/265 264/86 |
| 5,567,366 A | 10/1996 | Motegi et al. | |
| 6,257,546 B1 * | 7/2001 | Deakin | B28B 1/263 249/134 |
| 9,434,651 B2 | 9/2016 | Carden | |

(Continued)

FOREIGN PATENT DOCUMENTS

| | | |
|---|---|---|
| EP | 0561613 B1 | 11/1997 |
| EP | 1944145 A2 | 7/2008 |

(Continued)

*Primary Examiner* — Nicholas R Krasnow
(74) *Attorney, Agent, or Firm* — Charles Fowler

(57) ABSTRACT

Methods and apparatus are provided for pressure casting ceramic bodies. Methods and apparatus are provided for rapid ejection of cast ceramic bodies from a mold. A mold is described that has an impermeable cavity surface to provide dry release of the cast body. Ceramic bodies produced by the methods and apparatus have smooth, non-tacky surfaces after ejection from the mold.

19 Claims, 9 Drawing Sheets

(56) References Cited

U.S. PATENT DOCUMENTS

| | | |
|---|---|---|
| 9,790,125 B2 | 10/2017 | Beall et al. |
| 9,790,129 B2 | 10/2017 | Carden |
| 2014/0370291 A1 | 12/2014 | Diaz Rodriguez et al. |
| 2018/0206953 A1* | 7/2018 | Doviack ............. C04B 35/6261 |
| 2019/0127284 A1* | 5/2019 | Balasubramanian ........................ B28B 11/243 |
| 2019/0134848 A1* | 5/2019 | Podgorski ............. C04B 35/803 |

FOREIGN PATENT DOCUMENTS

| | | | |
|---|---|---|---|
| EP | 2774903 A1 | 10/2012 | |
| EP | 2531333 B1 | 2/2014 | |
| GB | 1295055 | 11/1972 | |
| GB | 1342890 A * | 1/1974 | ............. B30B 11/02 |
| GB | 2194751 A | 3/1988 | |
| GB | 2372958 B | 10/2004 | |

* cited by examiner

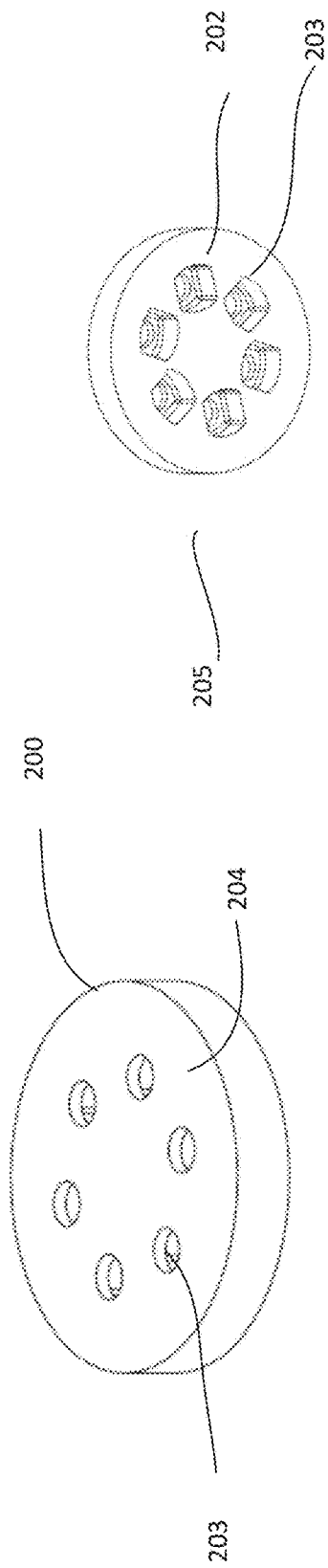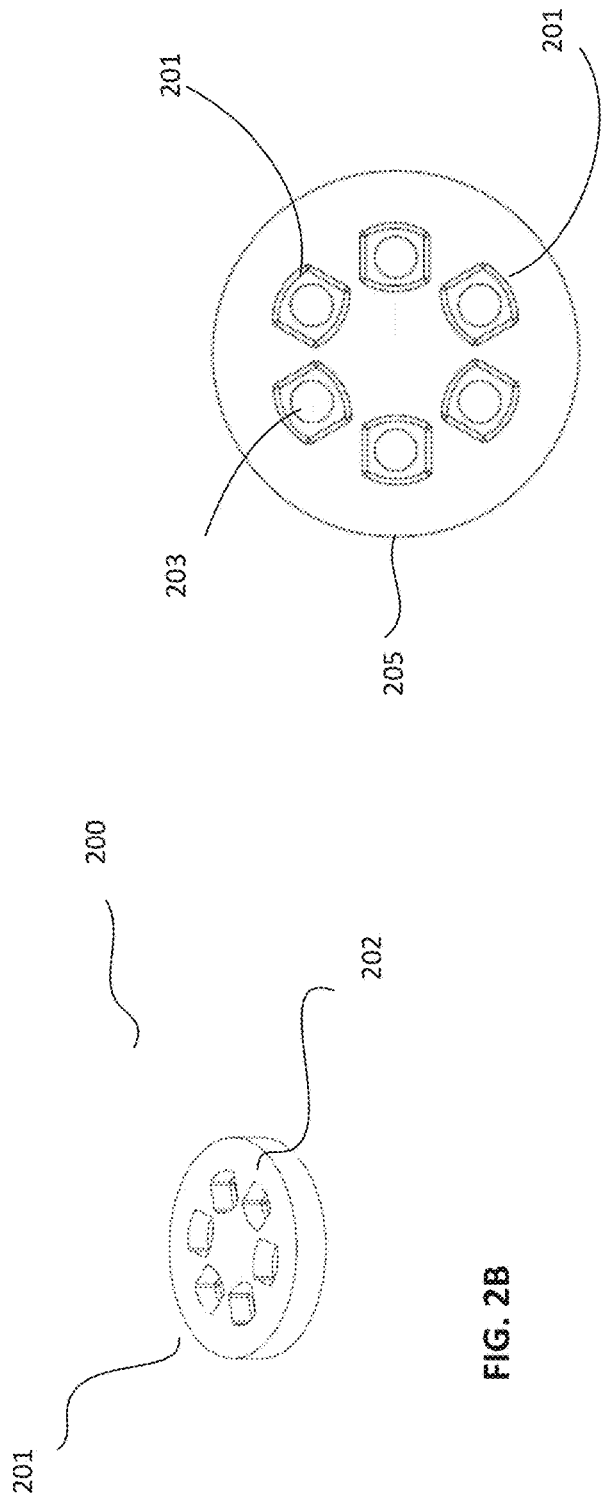

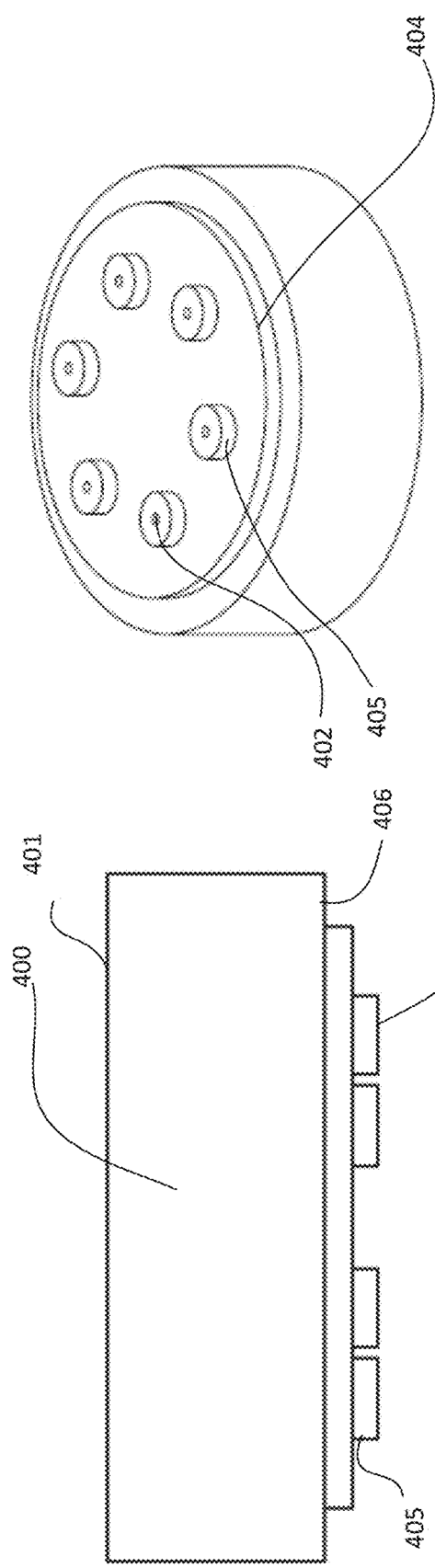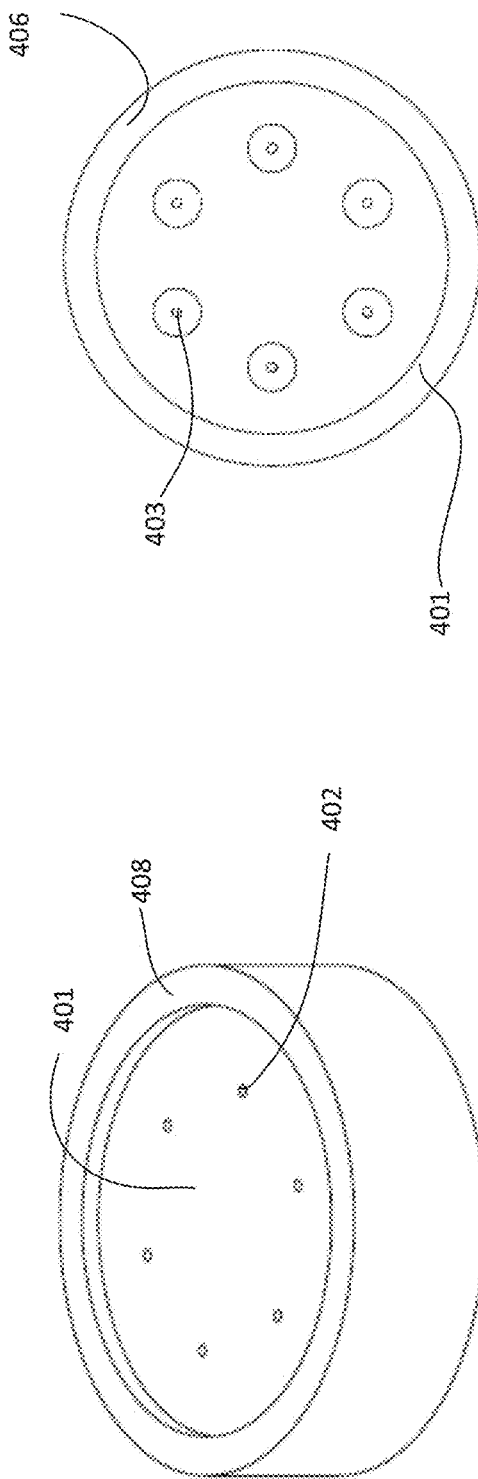
FIG. 4C
FIG. 4D
FIG. 4A
FIG. 4B

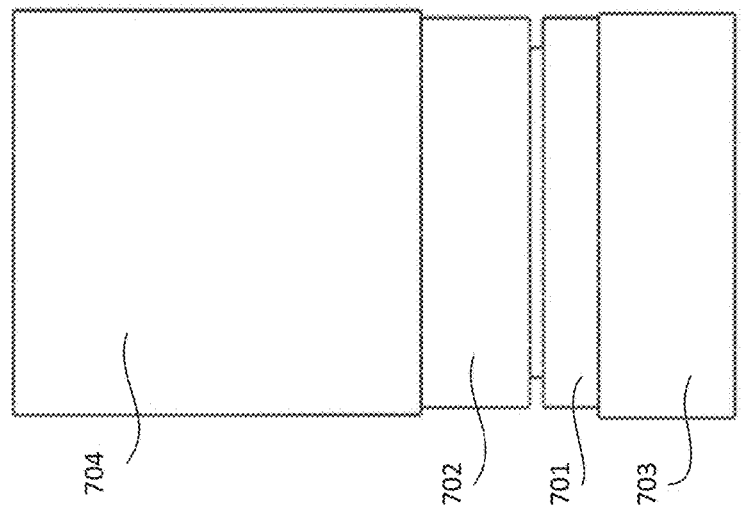
FIG. 7C
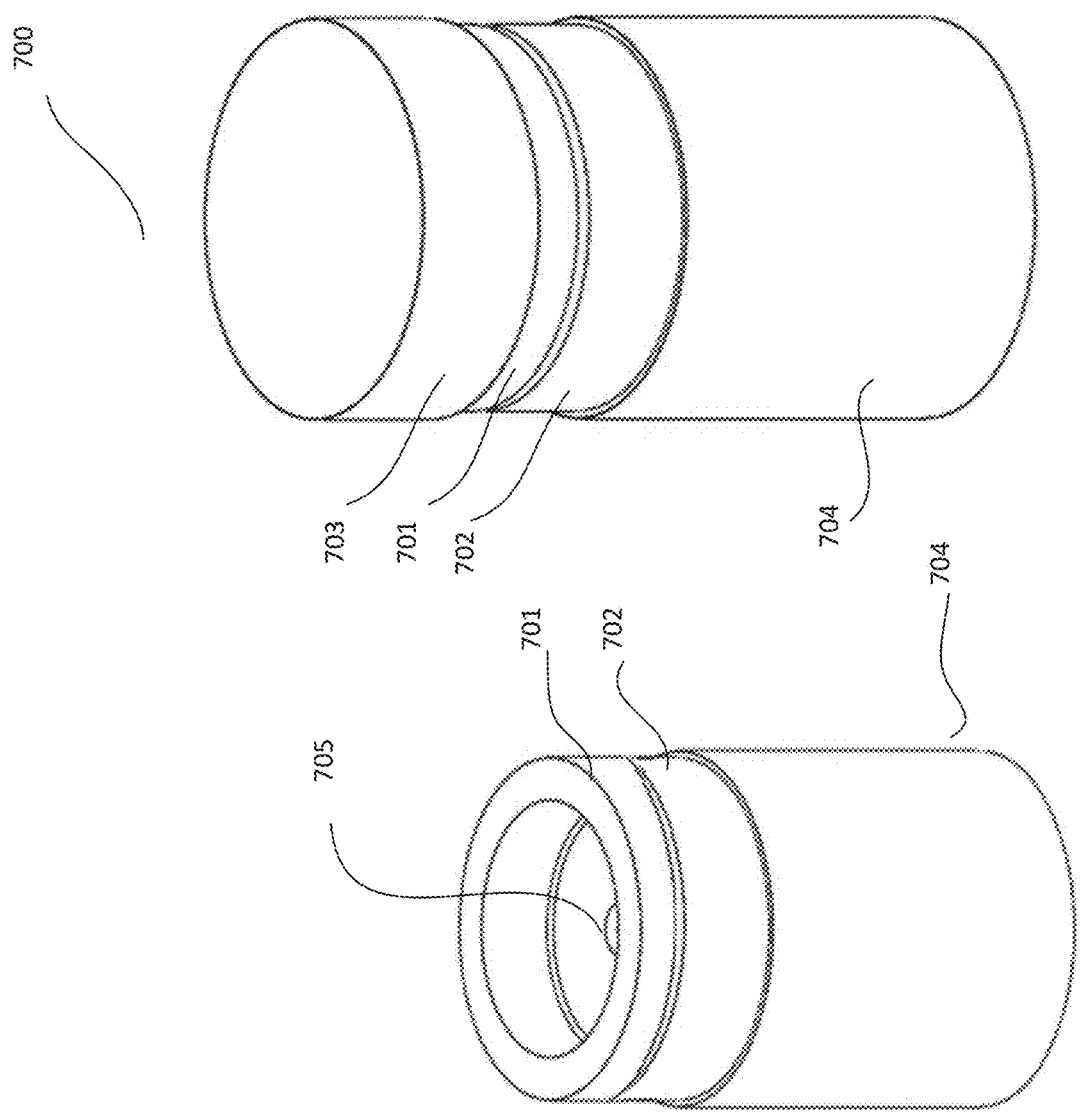
FIG. 7B
FIG. 7A

PRESSURE CASTING OF SUBMICRON CERAMIC PARTICLES AND METHODS OF EJECTION

RELATED APPLICATIONS

This application claims the benefit of and priority to U.S. Provisional Patent Application No. 62/842,580, filed May 3, 2019, the entirety of which application is incorporated herein by reference.

BACKGROUND

Methods for slip casting ceramic bodies in molds are known. Traditional casting processes using non-porous molds require significant drying time to remove water from the cast body to provide sufficient shrinkage for removal. Molds often incorporate a taper to facilitate removal, limiting the shape of the cast ceramic body.

Ceramic bodies made by pressure casting methods using porous molds may be quickly removed by floating the cast from the mold surface. During the casting process, water that enters the porous structure of the mold is forced back through the porous structure and into the mold cavity. As water is forced between the cavity surface and the ceramic body, the cast part is ejected. Disadvantageously, water and ceramic slip forced through the porous mold wet the surface of the cast body, forming a tacky surface causing cracks or breakage.

Commonly owned U.S. Pat. No. 9,790,125, incorporated herein by reference in its entirety, discloses a vacuum-assisted slip casting process, and vacuum-assisted slip casting assembly comprising a porous mold surrounded by an enclosure. Optionally, it is disclosed that pressure may be applied above the enclosure to promote the process. It is further disclosed that a blank may be removed by opening the enclosure and removing the mold and the ceramic blank.

UK patent GB 2 372 958, discloses a pressure casting assembly in which a ceramic body cast in a tapered cavity and a method for releasing the cast part from the mold. Compressed air introduced into the mold cavity forces excess water from the cast piece prior to pushing liquid from an inner liner into the mold cavity causing the molded piece to float off the inner liner.

SUMMARY

Methods and apparatus are provided for pressure casting ceramic parts and rapid ejection of a cast ceramic body from a mold. A mold is described that has an impermeable cavity surface providing a 'dry release' of the cast object. Ceramic bodies produced herein may have smooth, non-tacky surfaces after ejecting from the mold.

In one embodiment, a method for making a ceramic block comprises: i. providing a pressure casting apparatus comprising a mold having a porous casting substrate and an impermeable cavity surface; ii dispensing a ceramic slurry into a mold cavity under pressure; iii. removing liquid from the slurry under pressure via the porous casting substrate; iv. consolidating ceramic particles forming a cast ceramic body within the cavity; v. removing the porous casting substrate from the apparatus to form a mold opening; and vi. ejecting the resulting ceramic body from the mold opening by application of pressure in a dry release process.

In one embodiment, the apparatus for pressure casting a ceramic body is comprised of two components, i. a mold housing comprising the mold cavity having impermeable side surfaces and a top surface through which ceramic slurry is delivered into the mold cavity, and ii. a removable porous body comprising a porous casting substrate on which the ceramic body is formed.

The casting porous substrate may comprise an average pore size sufficiently small to inhibit movement of ceramic particles into the pore volume of the casting substrate during the pressure casting process while allowing removal of the liquid component of the slurry. In one embodiment, a porous casting substrate has an average pore size of less than 1 µm.

Impermeable cavity surfaces resist penetration of the liquid component of a ceramic slurry under casting pressure. One or more openings into the mold cavity through the impermeable surface allows delivery of the ceramic slurry to the mold cavity under pressure. In a further embodiment, the apparatus comprises a dispensing lid as a separate component that engages with the mold cavity for dispensing slurry into the cavity.

In one embodiment, pressure for ejecting a cast ceramic body may be delivered through the openings in the impermeable surface of the mold. In one embodiment, pressure is applied to a top surface of the cast ceramic body through the inlet of the mold. For example, compressed air may be applied through a hose or nozzle aligned with the inlet used to deliver the ceramic slurry, or other opening in the impermeable mold. The porous casting substrate may be separated from the cast ceramic body, and the cast body is ejected from the cavity opening.

A dry release process may be used to eject a cast ceramic part. In traditional processes, liquid retained in the pore volume of a porous mold is forced between the casting surface and the cast part to float the part off the casting surface. In contrast, in one embodiment where cavity side surfaces are impermeable, the cast part is ejected from the mold without re-introducing liquid from the casting process between the casting substrate and the cast body. Thus, in a dry ejection process described herein, cast ceramic parts are ejected from the mold cavity without floating the part from the casting surface. Advantageously, cast ceramic bodies may be ejected immediately after casting without drying or shrinkage. For example, wet cast parts may be ejected that comprises up to 12 wt % liquid.

In a further embodiment, the apparatus comprises an ejection lid for ejecting the ceramic body. After casting a ceramic body, a slurry dispensing lid may be removed from the mold and replaced by an ejection lid. Pressure may be delivered through the ejection lid into the cavities of the mold.

A process is provided wherein the ceramic slurry is cast unidirectionally, inhibiting uneven build-up of the ceramic on side surfaces of the mold. In one embodiment, as casting occurs in the z-axis direction, build-up of ceramic material progresses from the casting substrate towards the mold top surface, and build-up on cavity side surfaces is inhibited. The thickness of the ceramic body increases uniformly in the x-y direction.

Through methods provided herein, zirconia ceramic powder having a median particle size less than 400 nm may be cast to form solid ceramic bodies with a smallest dimension (e.g. thickness) that is greater than 10 mm, or greater than 15 mm, or greater than 25 mm, or greater than 30 mm. Ceramic bodies having smooth surfaces, and a uniform build-up of the ceramic material through the x-y direction, lack cracks or breakage after drying. The resulting ceramic bodies may be suitable for use as ceramic mill blocks that can accommodate single or multi-unit restoration bodies, including, but not limited to crowns, veneers, bridges, and dentures.

In other embodiments, zirconia ceramic powder having a median particle size less than 400 nm may be directly cast to form solid ceramic bodies having thin walls (e.g., 5-10 mm, 0.5 mm to 5 mm, or 0.5 mm to 2 mm, or 0.5 mm to 1 mm), non-uniform shapes, or non-uniform sizes, such as wafers, tabs, rods, or dental restorations such as crowns, veneers, bridges, and dentures.

Pressure-casting processes described herein significantly reduce casting time of ceramic bodies compared to known vacuum casting processes. Dry ejection processes described herein significantly reduce the time for removing the cast ceramic body from the mold.

BRIEF DESCRIPTION OF THE FIGURES

FIGS. 2A through 2D are illustrations of an exemplary embodiment of an impermeable mold.

FIGS. 4A through 4D are illustrations of an exemplary embodiment of an exemplary lid.

FIGS. 7A, 7B, and 7C are illustrations of an exemplary embodiment of a pressure casting apparatus and mold set-up.

DETAILED DESCRIPTION

A method and an apparatus are provided for pressure casting a ceramic body. Further, a method and apparatus are provided for the rapid ejection of the cast ceramic body from a mold. A mold set-up comprising an impermeable cavity surface and a porous casting substrate facilitates a 'dry release' of the cast object after pressure casting. Ceramic bodies produced herein may have smooth, non-tacky surfaces after ejecting from the mold, and reduced cracking and breakage after drying. The resulting ceramic bodies may be suitable for use as ceramic mill blocks that accommodate single or multi-unit restoration bodies, including, but not limited to crowns, veneers, bridges, dentures, and the like.

Figure 1A:
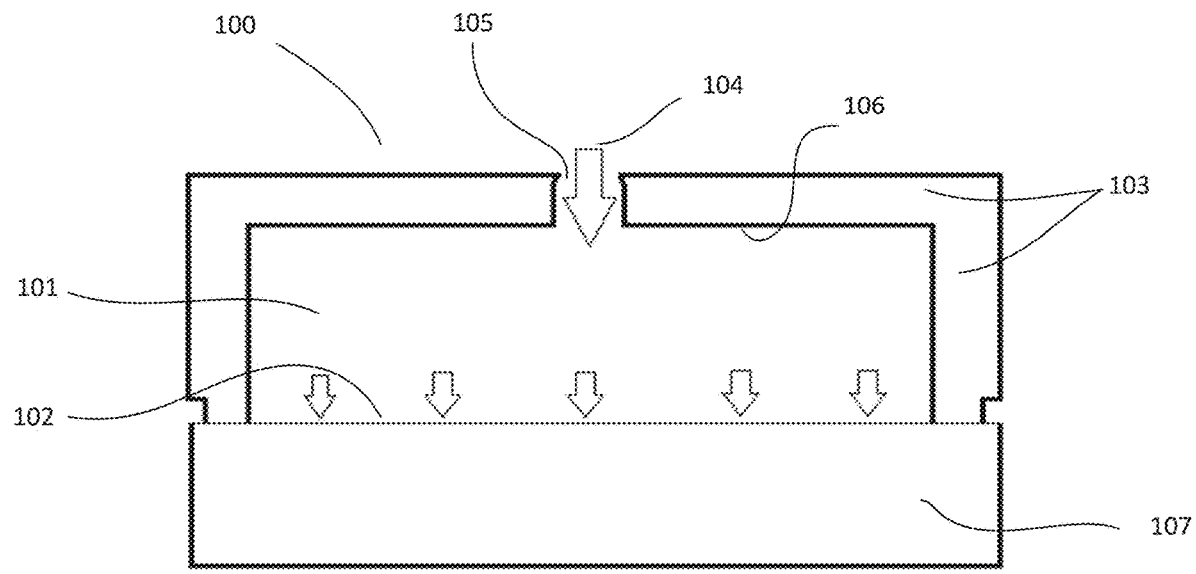
FIGS. 1A and 1B are illustrations of one embodiment of a method for casting a ceramic body.
Figure 1B:
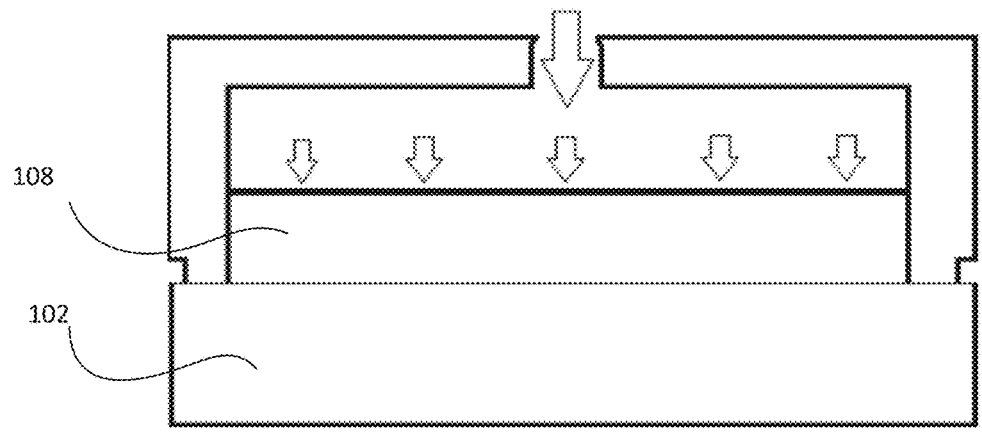

With reference to FIGS. 1A and 1B, a pressure casting set-up for unidirectional casting is illustrated. A mold set-up 100 is shown that comprises a mold cavity 101 in which a cast body is formed. A porous casting substrate 102 on which ceramic particles are deposited and a mold 103 define the mold cavity 101. An inlet 105 is provided through a mold top surface 106 which a ceramic slurry is delivered under pressure, and liquid from the slurry passes through the casting substrate 102 into the porous body 107. An opening of the mold cavity 101 is in communication with the porous casting substrate 102, and the cast ceramic body 108 is ejected through the opening after casting. The surface of the mold cavity perpendicular is impermeable to liquid and solid components of the slurry during the casting process. Optionally, the top surface of the mold cavity is also impermeable to the slurry components.

The mold 103 comprises a material suitable for resisting penetration of the liquid or solid components of the ceramic slurry during a pressure casting process while maintaining dimensional stability of the mold cavity. Suitable materials include, but are not limited to polytetrafluoroethylene, alumina, acetyl plastic, and the like. In one embodiment, the mold comprises a rigid, monolithic structure wherein a solid block of material, such as plastic is milled to form the cavities. In another embodiment, the mold comprises a porous or permeable structure having an impermeable coating on cavity-facing side surfaces.

An impermeable mold 200 is exemplified in the illustrations of FIGS. 2A through 2D. A mold 200 may comprise a single mold cavity 201, or more than one mold cavities 201 for simultaneously casting multiple ceramic bodies. Cavity-facing side surfaces 202 of the mold are impermeable to both the liquid and solid components of the ceramic slurry under pressure casting conditions, throughout the casting process. As seen in FIG. 2A, one or more inlet ports 203 extend through the top 204 of the mold to deliver ceramic slurry into the cavities 201. A lower surface 205 of the mold shown in FIGS. 2C and 2D, is in intimate contact with the porous casting substrate (illustrated in FIG. 3B, 306), when the two components are assembled.

The porous casting substrate comprises a median pore diameter that is sufficiently small to inhibit movement of ceramic particles into the pore volume of the casting substrate. Ceramic particles form a layer on the porous casting substrate and continue to build in thickness, as liquid from the ceramic slurry is removed by passing through ceramic particles into the porous casting substrate. The porous casting substrate 102 may have a submicron median pore diameter. In some embodiments, the median pore diameter is less than 3 µm, such as less than 1 µm, or between 0.1 µm and 0.6 µm. In some embodiments, the ratio of median pore diameter of the casting substrate to median particle size of the ceramic component may be from 10:1 to 1:1, such as from 5:1 to 1:5.

The porous casting substrate may comprise one or more porous materials including, but not limited to plaster, such as gypsum, or a porous plastic such as hydroxypropyl cellulose, or copolymers of acrylic acid and methacrylic acid, and the like. The casting substrate should have sufficient rigidity to maintain the cavity shape during the casting process. In other embodiments, the porous casting substrate may comprise a filter paper, cloth or membrane backed by a supporting structure or material, such as a metal filter.

Figure 3B:
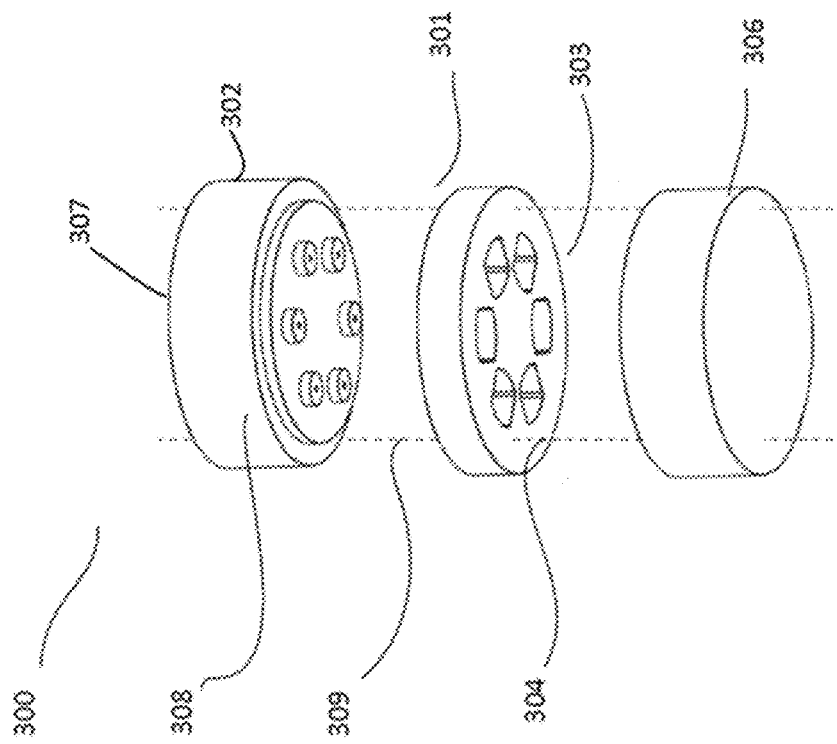
FIGS. 3A through 3C are illustrations of two exemplary embodiments of an apparatus comprising an impermeable mold and lid.
Figure 3A:
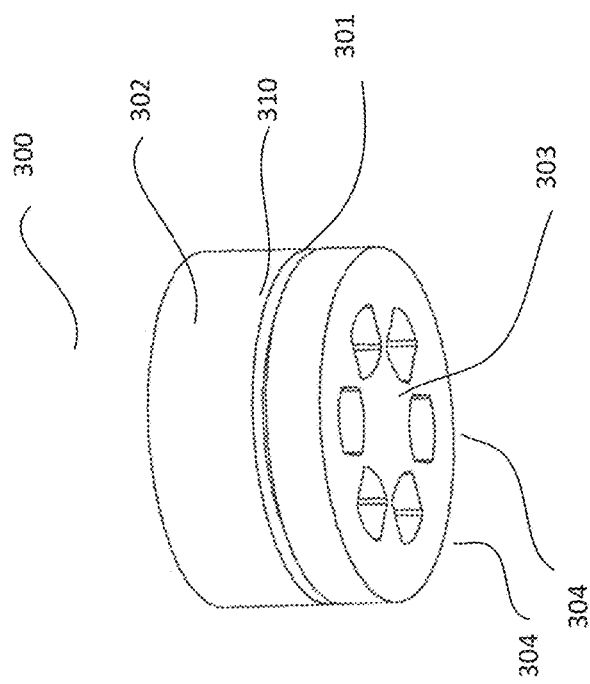
Figure 3C:
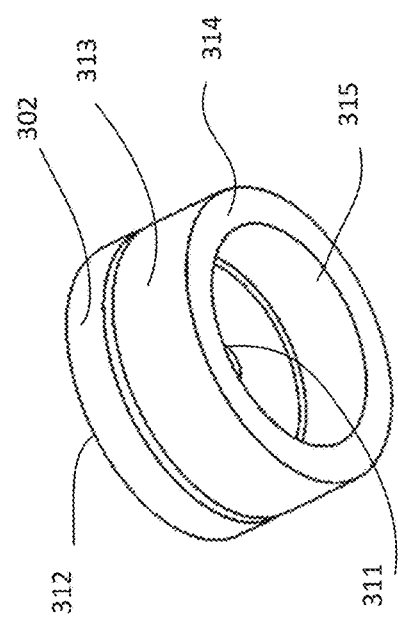

In a further embodiment, as illustrated in FIGS. 3A through 3C, an apparatus 300 comprises a mold 301 and a slurry dispensing lid 302. The slurry dispensing lid engages with an upper surface 309 of the mold 301. Slurry introduced to an upper surface 307 of the lid 302 is dispensed under pressure into mold cavities 304 through passages 308 that align with inlet ports 203 in the mold 301 when the lid and mold are assembled. As exemplified in the exploded view of FIG. 3B, the dispending lid 302, mold 301 and porous casting substrate 306 form an apparatus. A bottom surface 303 of the mold and openings of mold cavities 304 are in intimate contact with the porous substrate 306 when assembled.

FIG. 3C illustrates a further embodiment of a mold 313, in which a single ceramic body may be formed in the shape of a large disk. A top surface of the mold may attach to a lid 302 and slurry may be delivered from the top of the dispensing lid 312 under pressure through an opening 311 in the top of the mold 313. A mold cavity in which the ceramic body is formed, comprises an a mold wall 314 and a cavity opening 315 that are in direct communication with a porous casting substrate when assembled. After casting, the ceramic body is ejected through the mold opening 315 after separating the porous casting substrate from the mold.

In one embodiment, a dispensing lid 400 as illustrated in FIGS. 4A through 4D, comprises an upper surface 401 having openings 402 that connect to passages 403 through the thickness of the dispensing lid. A passage 403 may overlay an inlet port 203 of the mold cavity. In an alternative embodiment, the opening 402 may form a passage 403 through a plug 405 that engages with the inlet 203 on the mold. In one embodiment, the lower surface 404 of the slurry dispensing lid 400 comprises a raised surface that forms an edge 406 providing a gap 310 between the mold 301 and lid 302 when assembled. The edge 406 may facilitate separating the lid from the mold after casting. In a further embodiment, the upper surface 401 of the dispensing lid may be substantially flat, or may comprises a rim 408, for example, for holding slurry or securing a slurry pot.

In a further embodiment, the mold cavity may be open on both the bottom and the top surfaces. The dispensing lid may serve as the top surface of the mold cavity when the lid and mold are assembled.

Figure 5:
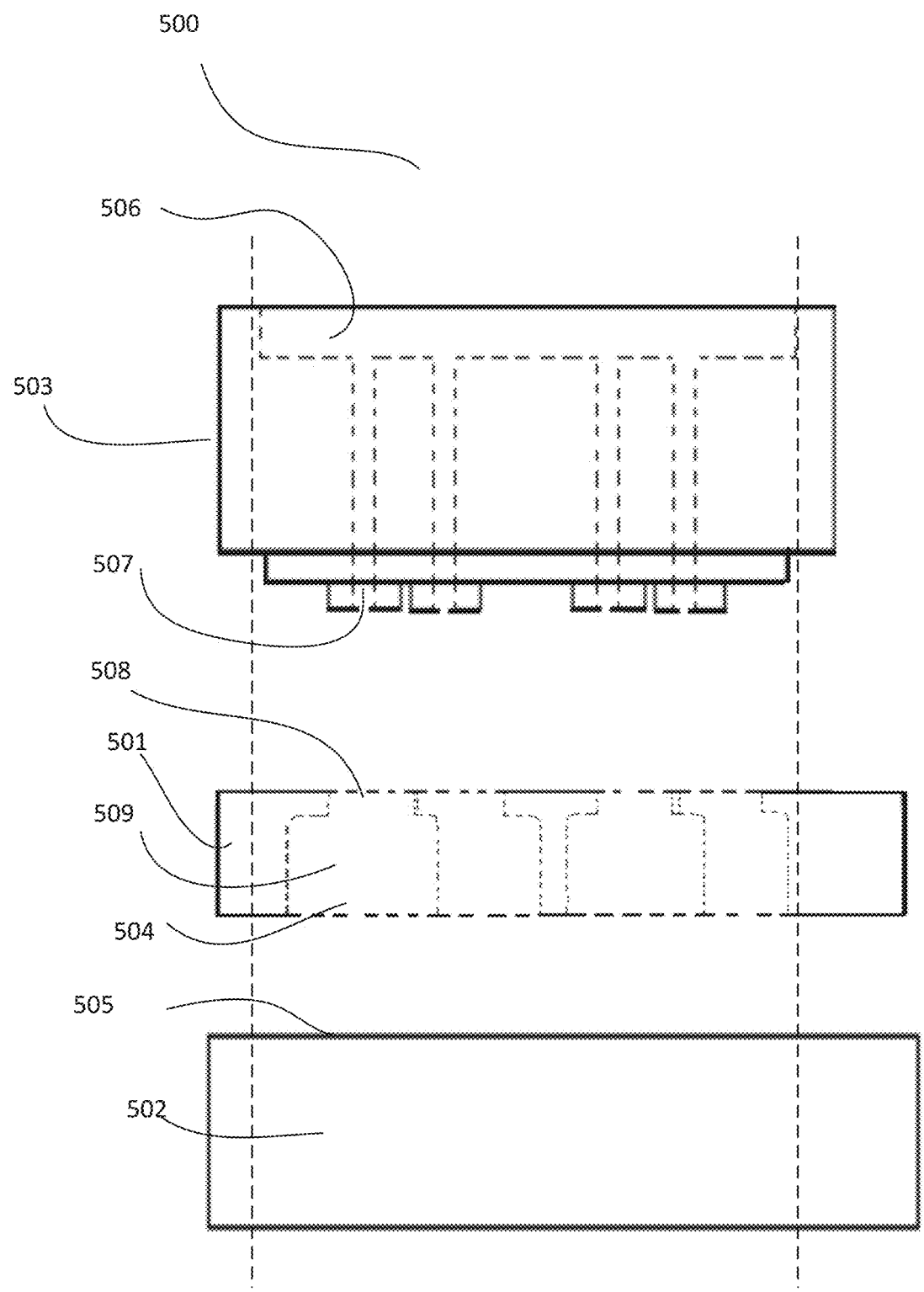
FIG. 5 is an illustration of an exploded view of an exemplary embodiment of a mold set-up.

In FIG. 5, an exemplary embodiment of a mold-set up 500 is illustrated in exploded view. A mold 501 is positioned between a porous casting body 502 and a lid 503. Mold cavities 504 have a lower opening that is in communication with an upper surface 505 of the porous substrate, and inlet ports 508 on the top surface that are in communication with passages of the dispensing lid 503. Slurry is dispensed into the lid upper surface 506 through passages 507 that align with inlet ports 508 to fill the cavity 509. In one embodiment, the passages 507 fit within cavity inlet ports 508. In another embodiment, the passages 507 encircle the cavity inlet port.

After pressure casting, the slurry dispensing lid 503 may be removed. Ceramic from the casting process may build up within the passages and form a column of ceramic material within and between the inlet port and the passages. Ceramic columns may be broken by removing the lid from the mold. In one embodiment, both the slurry dispensing lid 503 and the porous casting substrate 505 are separated from the mold after casting. A force may be applied directly through the inlet ports to the ceramic body within the cavity to eject the ceramic body through the cavity opening 504.

Figure 6A:
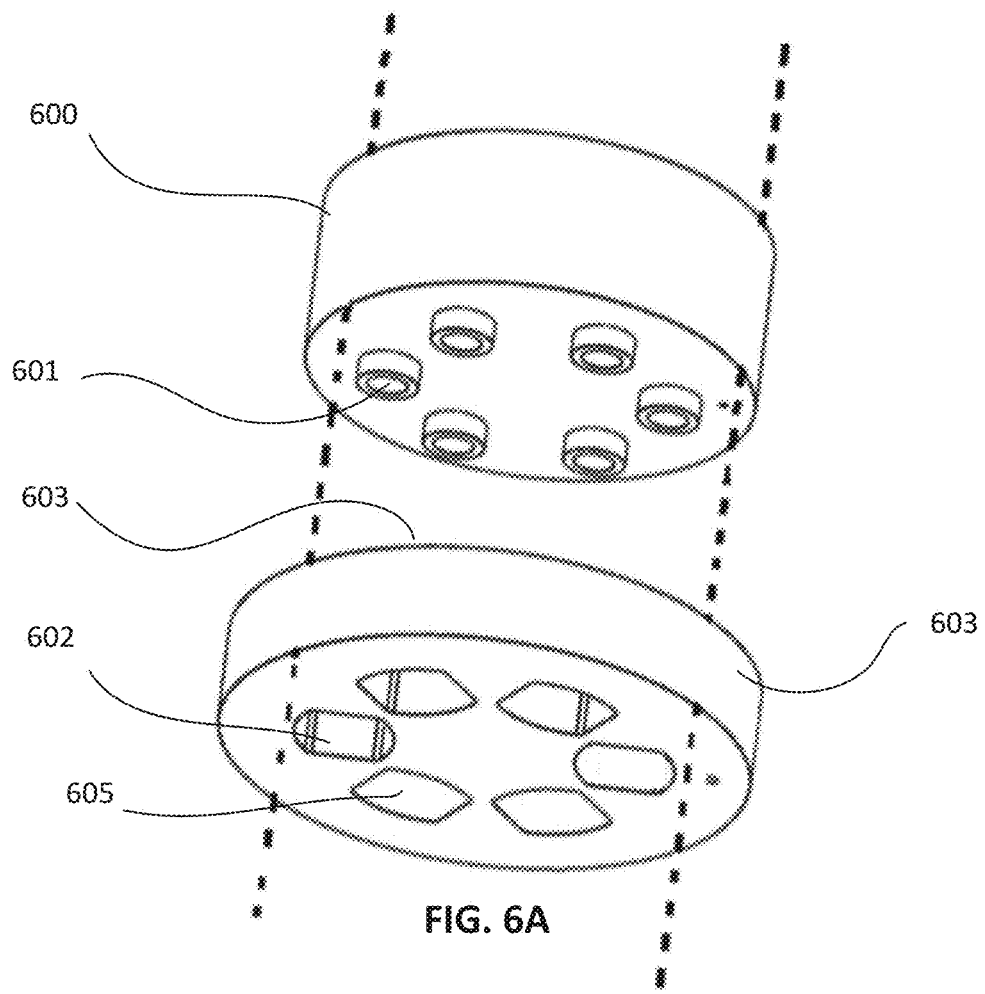
FIG. 6A is an illustration of an exploded view of an exemplary for ejecting ceramic cast parts.
Figure 6B:
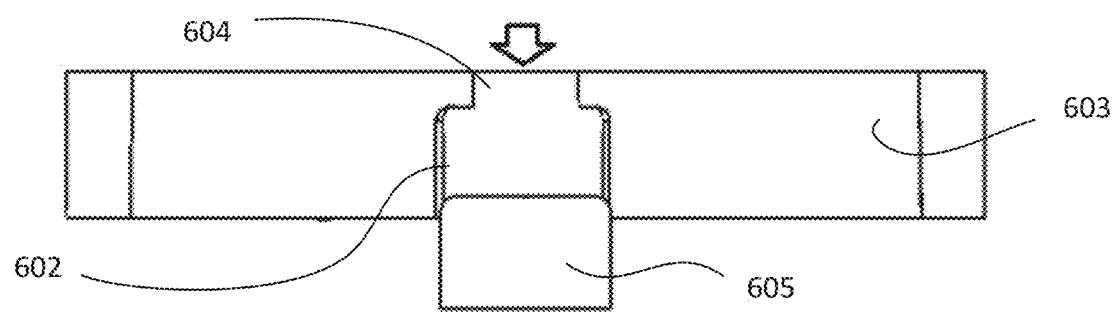
FIG. 6B is an illustration of an exemplary method of ejecting a ceramic cast part from a mold.

In another embodiment, the slurry dispensing lid is replaced with a release apparatus 600 to commence an ejection process. In the embodiment illustrated in FIG. 6A, passages 601 extend through the thickness of the release apparatus 600 and align with mold cavities 602 in the mold 603. A force may be applied through the passages 601 into openings 604 on the top surface 603 of the mold, and into the cavities 602. For example, a gas, such as compressed air, may be delivered through passages 601 into the cavities, and/or onto the ceramic bodies 605, as illustrated in FIG. 6B, to eject the cast ceramic bodies 605 from an opening in the bottom of the cavity.

In some embodiments, a pressure of 0.5 psi or greater, such as approximately 5 psi or greater, such as from 7 psi to 15 psi, or from 20 psi to 80 psi, or from 20 psi to 30 psi, may be introduced into the cavity to eject the ceramic body from the mold. Pressure may be applied, for example, by mechanical piston, or compressed gas, such as compressed air. In one embodiment, compressed air may be delivered, for example via one or more hoses, fittings, nozzles and the like, that align with passages in the release apparatus. Simultaneously or sequentially ejection of multiple ceramic cast bodies from the mold may be suitable for use in continuing manufacturing processes.

In some embodiments, vacuum may be used instead of, or in addition to, the positive pressure applications described above. Vacuum may be applied and delivered, for example, via one or more hoses, fittings, nozzles and the like that align with passages at the exit of the mold cavity in order to facilitate dry ejection of the ceramic cast bodies from the mold.

Where the mold is comprised of an impermeable material that does not retain liquid and/or solid components of a slurry during a casting process, the ceramic body is ejected in a dry release process. In this embodiment, the ceramic body is ejected without releasing water from the mold and into the cavity. Thus, in one embodiment, a dry release process is used for ejecting the cast part from the mold cavity wherein the ejected body is not floated off the mold cavity-facing surface with liquid. In other embodiments, the dry ejection process may be used for slip casting methods such as vacuum casting.

Ceramic bodies may be ejected from the mold without drying to remove residual liquid component from the cast ceramic body. In some embodiments, ceramic bodies ejected from the mold comprise more than 8 wt % residual liquid, such as between 8 wt % and 15 wt % liquid, or between 10 wt % and 12 wt %, residual liquid from the slurry. In some embodiments, the ceramic parts are ejected without shrinkage, and have substantially the same dimension as the inner diameter of the mold, after ejection and prior to drying. In some additional embodiments, the ceramic parts are ejected prior to drying while having less than 2.0% shrinkage, such as less than 1.0% shrinkage, such as less than 0.5% shrinkage, such as less than 0.1% shrinkage, such as less than 0.05% shrinkage relative to the inner dimension (e.g., diameter) of the mold.

A release agent may be applied to one or more surfaces of the mold cavity. Release agents include but are not limited to lubricants such as petroleum jelly, oleic acid, and the like, for example, that are at least partially insoluble under casting conditions.

Casting and ejection methods described herein may be used with ceramic slurries that include, but are not limited to, alumina, zirconia, boron carbide, silicon carbide, spinel, and barium titanate. Ceramic slurry may comprise ceramic materials suitable for use in manufacturing dental restorations, such as crowns, veneers, bridges and dentures. In some embodiments, ceramic material suitable for use in dental applications may comprise zirconia, alumina, or combinations thereof. Zirconia ceramic material may comprise stabilized, partially stabilized or fully stabilized zirconia ceramic material.

In some embodiments, zirconia powders may include yttria-stabilized zirconia that has been stabilized with approximately 0.1 mol % to approximately 8 mol % yttria, such as approximately 2 mol % to 7 mol % yttria, or approximately 2 mol % to approximately 4 mol % yttria, or approximately 4 mol % to approximately 6 mol % yttria. Specific examples of yttria-stabilized zirconia powders include yttria-stabilized zirconia commercially available from Tosoh USA, such as Tosoh TZ-3YS (containing 3 mol % yttria, or 3Y), Tosoh PX485 (containing 4 mol % yttria, or 4Y), and Tosoh PX430 (containing 5-6 mol % yttria, such as 5.5Y. Commercially available zirconia powder may have a measured particle size D(50) of about 600 nm or more, which constitute agglomerations of particles of crystallites having an actual particle size of about 20 nm to 40 nm. As used herein, the term "measured particle size" refers to measurements obtained by a Brookhaven Instruments Corp. X-ray disk centrifuge analyzer. The comminution processes described herein may reduce the measured particle size of the zirconia powder contained in the slurry from the D(50) <600 nm, to a range of D(50)=100 nm to 400 nm, such as D(50)=200 nm to 300 nm.

In additional embodiments, zirconia powders may have a measured particle size D(50) of 100 nm or less. The comminution processes described herein may be used to reduce the measured particle size of the zirconia powder contained in the slurry from the D(50)<100 nm, to a range of D(50)=20 nm to 90 nm, such as D(50)=30 nm to 70 nm. These zirconia powders may include yttria-stabilized zirconia that has been stabilized with approximately 0.1 mol % to approximately 8 mol % yttria, such as approximately 2 mol % to 7 mol % yttria, or approximately 2 mol % to approximately 4 mol % yttria, or approximately 4 mol % to approximately 6 mol % yttria. Specific examples of yttria-stabilized zirconia powders include yttria-stabilized zirconia commercially available from Inframat Corporation, USA, such as 4039ON-9501, 4039ON-9502 (containing 3 mol % yttria, or 3Y), 4039ON-8601 (containing 8 mol % yttria, or 8Y) or mixtures thereof.

In additional embodiments, the nano powders are mixed with submicron powders, such as in a comminution process described herein to get a mixed powder with a D(50)<200 nm, to a range of D(50)=20 nm to 180 nm, such as D(50)=40 nm to 100 nm.

The yttria-stabilized zirconia powders may include alumina at a concentration of 0 wt % to 0.25 wt %, such as 0.1 wt %, relative to the zirconia powder. Optional additives include coloring agents and esthetic additives, such as metal oxides and metal salts, or other metal-containing compounds used to obtain dentally acceptable shades in final sintered restorations. In some embodiments further processing aids such as binders and dispersants may added to the slurry.

Dispersants suitable for use in casting the green body promote dispersion and stability of the slurry, and controlling the viscosity of the slip. Dispersion and deflocculation occur through electrostatic, electrosteric, or steric stabilization. Examples of suitable dispersants include nitric acid, hydrochloric acid, citric acid, diammonium citrate, triammonium citrate, polycitrate, polyethyleneimine, polyacrylic acid, polymethacrylic acid, polymethacrylate, polyethylene glycols, polyvinyl alcohol, polyvinyl pyrillidone, carbonic acid, and various polymers and salts thereof. These materials may be purchased commercially or prepared with well-known techniques. Specific examples of commercially available dispersants include Darvan® 821-A ammonium polyacrylate dispersing agent commercially available from Vanderbilt Minerals, LLC; Dolapix™ CE 64 organic dispersing agent and Dolapix™ PC 75 synthetic polyelectrolyte dispersing agent commercially available from Zschimmer & Schwarz GmbH; and Duramax™ D 3005 ceramic dispersant commercially available from Rohm & Haas Company.

The liquid component may comprise water, organic solvent, inorganic solvent, and combinations thereof. A ceramic slurry comprising a liquid component and a ceramic component, may comprise a ceramic loading of between 20 wt % and 90 wt %, such as between 40 wt % and 80 wt %, based on the total weight of the ceramic slurry. Zirconia powder and dispersant are added to the liquid component, such as water, to obtain a slurry. The slurry may be subjected to a comminution process by which the zirconia powder particles are mixed, deagglomerated, and/or reduced in size. Comminution is performed using one or more milling processes, such as attritor milling, horizontal bead milling, ultrasonic milling, or other milling or comminution process, such as high shear mixing, ultra high shear mixing capable of reducing the zirconia powder particle sizes described herein.

Ceramic slurry dispensed into the mold may be cast at a pressure up to approximately 1000 psi, such as from 20 psi to 600 psi, or 40 psi to 600 psi, or 40 psi to 300 psi, or greater than or equal to approximately 50 psi, such as 50 psi to 600 psi, or 50 psi to 200 psi. Devices for casting the slurry under pressure, include, but are not limited to, commercially available pressure casting machines for casting ceramics, or a pressure pot coupled to an air condenser. In a further embodiment, vacuum may be applied to the porous mold to aid removal of the liquid component.

In one embodiment, a method for making a ceramic block is provided that comprises i. providing a pressure casting apparatus that comprises a mold having an impermeable cavity surface and a cavity opening that is in direct contact with a porous casting substrate; ii delivering a ceramic slurry into the mold cavity and casting the slurry under pressure greater than 20 psi; iii. removing liquid from the slurry under pressure via the porous casting substrate; iv. consolidating ceramic particles forming a ceramic green body within the cavity; v. removing the porous casting substrate from the apparatus to expose a mold opening; and vi. ejecting the resulting ceramic green body from the mold opening by a dry release process using a pressure greater than 20 psi.

Cast ceramic bodies made by the methods described herein may have a smallest dimension greater than 10 mm, or greater than 15 mm, or greater than 20 mm. In one embodiment, a ceramic green body in the shape of a solid mill block or disk having a thickness greater than 10 mm is formed from a binderless slurry of yttria-stabilized zirconia with an average particle size of less than or equal 300 nm. The resulting body has sufficient green strength to withstand the ejection processes described herein, and may further withstand handling and/or molding or shaping before sintering.

In other embodiments, zirconia ceramic powder having a median particle size less than or equal to 300 nm are directly cast to form solid ceramic bodies having thin walls (e.g., 0.5 mm to 5 mm, or 0.5 mm to 2 mm, or 0.5 mm to 1 mm), non-uniform shapes, non-uniform sizes, or irregular cross-sectional dimensions such as near net shape mill blanks, wafers, tabs, rods, or dental restorations such as crowns, veneers, bridges, and dentures.

Pressure-casting processes described herein significantly reduce casting time compared to known vacuum casting processes. Dry ejection processes described herein significantly reduce the time for removing the cast ceramic body from the mold; by eliminating a drying step, a ceramic body comprising more than 8 wt % of liquid may be ejected within seconds of completing casting. Thus, the methods described herein for producing strong green bodies comprising yttria-stabilized zirconia having small particle size are suitable for use in automated manufacturing processes.

EXAMPLES

Example 1

A zirconia ceramic body suitable for use in milling single or multi-unit dental restorations was formed by a pressure casting process and ejected by a dry release process.

A pressure-casting apparatus 700 substantially according to FIGS. 7A through 7C, was used to cast a zirconia ceramic slurry. As seen in FIG. 7A, the apparatus comprised a mold 701 having a single cavity with dimensions of 98 mm diameter×30 mm depth. The mold cavity was made from acetyl plastic, and the mold dispensing lid 702 was comprised of a separate component made from acetyl plastic. The plastic material of the mold cavity was impermeable to the slurry during the casting process. As seen in FIG. 7B, a porous polymer casting body 703 having a porous casting substrate (with a median pore size of 1 μm), was placed on top of the mold cavity, prior to inverting the set-up for the casting process.

As illustrated in FIG. 7C, the mold set-up was inverted, so that the mold lid 702 was above the mold 701 which rested on the porous casting substrate of the plaster body 703. A ceramic slurry was prepared comprising water, dispersant, and an yttria-stabilized zirconia dental ceramic having a median particle size 280 nm (D50). The binderless slurry had a ceramic loading 79 wt % and was placed in a slurry pot 704 which was on top of the mold lid 702 after inverting the set-up. The ceramic slurry was dispensed from the slurry pot and through an inlet 105 in the mold lid 702 filling the cavity 101 at a casting pressure of approximately 174 psi.

As illustrated in the casting process of FIG. 1, casting proceeded unidirectionally (according to the direction of the arrows) by delivery of the slurry towards the porous casting substrate 102 from the top of the impermeable mold 103, and the thickness of the ceramic increased uniformly throughout the x-y direction of the cast body.

A ceramic green body (98 mm diameter×25 mm thickness) was cast in 2.5 hours with a pressure of approximately 174 psi. Upon completion of the casting process, the porous casting substrate was removed from the apparatus to expose the cavity opening through which the ceramic body was ejected. The ceramic body was ejected by a dry release process with the application of air pressure 104 of 40 psi into the cavity supplied by an airline inserted through the inlet 105 at the top surface of the plastic mold. No water was pushed into the cavity from the mold during the ejection process. After ejection, the ceramic body had a dimension substantially the same as the inner diameter of the mold, and comprised about 10 wt % of liquid from the casting process.

The resulting green body had a smooth surface, lacking cracks or breakage, and uniform build-up of the ceramic material through the x-y direction of the ceramic body.

Example 2

A nano zirconia ceramic body suitable for use in milling single dental restorations was formed by a pressure casting process and ejected by a dry release process.

Figure 10C:
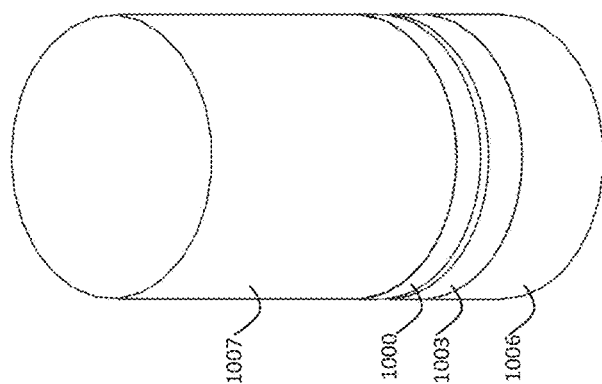
FIGS. 10A, 10B, and 10C are illustrations of an exemplary embodiment of a ceramic casting system and method of ejecting a ceramic cast part from a mold.
Figure 10B:
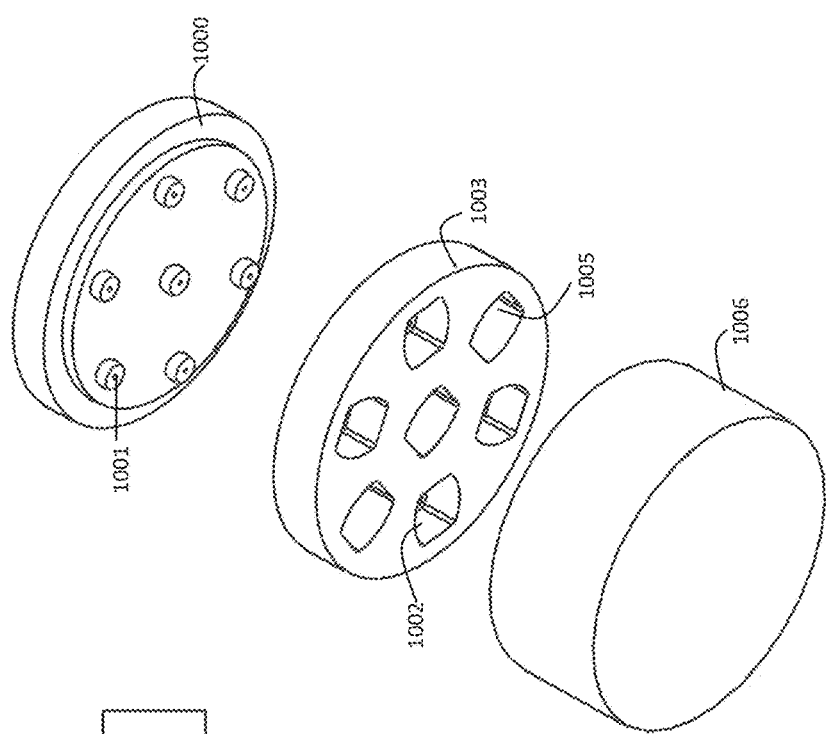

A pressure-casting apparatus substantially according to FIGS. 10B and 10C, was used to cast a zirconia ceramic slurry. As seen in FIG. 10B, the apparatus comprised a mold 1003 having seven cavities each with ~60 sq. mm cross section and a 16 mm depth. The mold cavity was made from acetyl plastic, and the mold dispensing lid 1000 was comprised of a separate component made from acetyl plastic. The plastic material of the mold cavity was impermeable to the slurry during the casting process. The mold cavity was located on top of a porous polymer casting body 1006 having a porous casting substrate (with a median pore size of 1 μm).

As illustrated in FIG. 10C, the mold lid 1000 was above the mold 1003 which rested on the porous polymer casting body 1006. A ceramic slurry was prepared comprising water, dispersant, and an yttria-stabilized zirconia dental ceramic having a median particle size 65 nm (D50). The binderless slurry had a ceramic loading 50 wt % and was placed in a slurry pot 1007 which was on top of the mold lid 1000 after inverting the set-up. The ceramic slurry was dispensed from the slurry pot and through the inlet 1001 in the mold lid 1000 filling the cavity 1002 at a casting pressure of approximately 174 psi.

The casting proceeded unidirectionally by delivery of the slurry towards the porous polymer and the thickness of the ceramic increased uniformly throughout the x-y direction of the cast body.

Figure 10A:
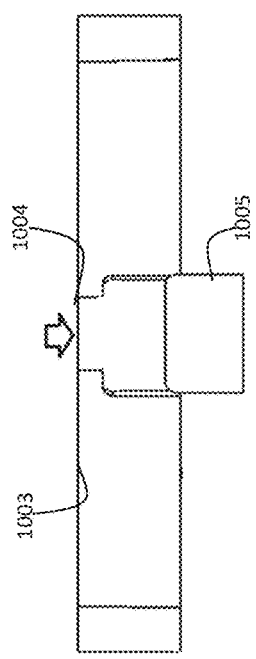

A ceramic green body (60 sq.mm cross section by 9 mm thickness) was cast in 5 hours with a pressure of approximately 174 psi. As shown in FIG. 10A, upon completion of the casting process, the porous backing was removed from the apparatus to expose the cavity opening through which the ceramic body 1005 was ejected. The ceramic body was ejected by a dry release process with the application of air pressure of 80 psi into the cavity supplied by an airline inserted through the inlet 1004 at the top surface of the plastic mold. No water was pushed into the cavity from the mold during the ejection process. After ejection, the ceramic body had a dimension substantially the same as the inner diameter of the mold, and comprised about 15 wt % of liquid from the casting process.

The resulting green body 1005 had a smooth surface, lacking cracks or breakage, and uniform build-up of the ceramic material through the x-y direction of the ceramic body.

(Comparative) Example 3

A traditional pressure casting apparatus was used to cast a ceramic slurry. The apparatus comprised a porous two-part mold, having a top part 801 and a bottom part 802 that formed a mold cavity 800 with dimensions of 98 mm diameter×30 mm depth when assembled. The median pore size of the porous mold was less than 1 μm.

Figure 8:
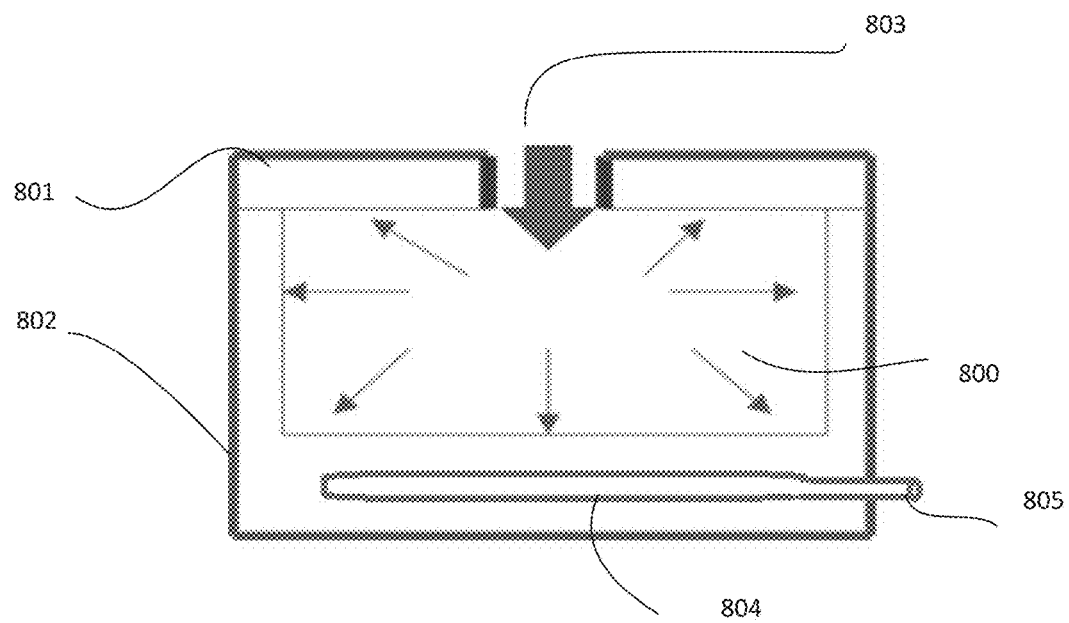
FIG. 8. is an illustrative representation of a traditional multi-directional casting process for casting a ceramic slurry in a porous mold.

A ceramic slurry substantially according to Example 1, was delivered into the cavity 800 through an opening 803 at a casting pressure of 174 psi. Casting occurred multi-directionally, as ceramic particles deposited on multiple surfaces and corners (e.g., side, top and bottom) of the mold cavity surface, as illustrated in by the arrows in FIG. 8. All cavity surfaces were porous, and contained water and slurry within the porous mold from the casting process. Water was also removed from the porous mold through a space 804 in the porous mold.

A ceramic green body (98 mm diameter×25 mm thickness) cast in 40 minutes. The mold top 801 and mold bottom 802 were separated to expose an opening in the top of the mold. Air pressure was delivered to the space 804 in the mold through an air fitting 805 forcing water and slip back through the porous mold structure, into the cavity between the ceramic green body and the mold cavity surface to float the ceramic part off the cavity surface through the top of the mold.

Figure 9A:
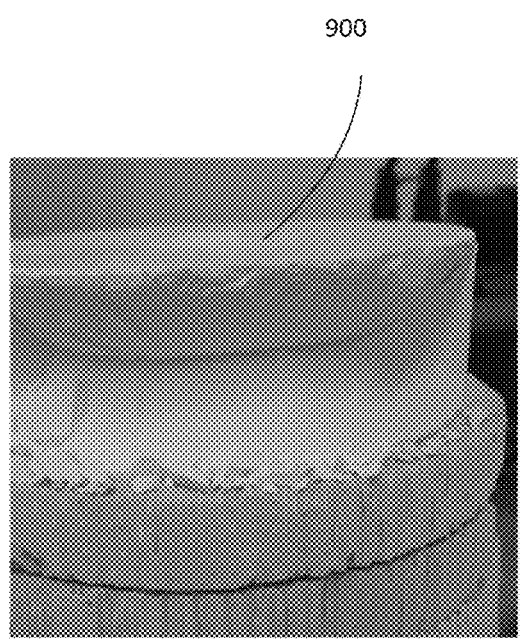
FIGS. 9A and 9B. are representations of a ceramic body cast and removed by traditional pressure casting and removal techniques.
Figure 9B:
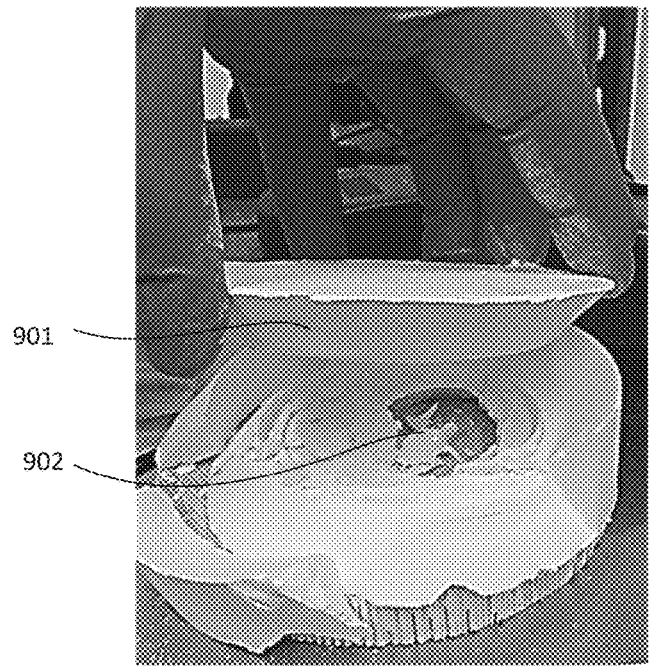

As illustrated in FIGS. 9A and 9B, the resulting green body 900 had a tacky surface, which resulted in cracks on the surface. Ceramic build-up was greatest on top, bottom and side surfaces 901 with less ceramic build-up in the center 902 of the body. Uneven distribution of ceramic particles throughout the body resulted in a weaker center causing breakage during drying (e.g., at ambient temperature, or oven at 30° C.).

The foregoing disclosure has been set forth merely to illustrate various non-limiting embodiments of the present disclosure and is not intended to be limiting. Since modifications of the disclosed embodiments incorporating the spirit and substance of the disclosure may occur to persons skilled in the art, the presently disclosed embodiments should be construed to include everything within the scope of the appended claims and equivalents thereof. All references cited in this application are incorporated herein by reference in their entireties.

What is claimed is:

1. A method for making a ceramic block, comprising:
a) providing a pressure casting apparatus that comprises a mold having an impermeable cavity surface and a cavity opening that is in direct contact with a porous casting substrate;
b) delivering a ceramic slurry into the mold cavity and casting the slurry under pressure, vacuum, or a combination of pressure and vacuum greater than 20 psi;
c) removing liquid from the slurry under pressure via the porous casting substrate;
d) consolidating ceramic particles forming a ceramic green body within the cavity;
e) removing the porous casting substrate from the apparatus to expose a mold opening; and
f) ejecting the resulting ceramic green body from the mold opening by a dry release process using a pressure, vacuum, or a combination of pressure and vacuum greater than 5 psi;
wherein the difference between the volume of the green body and the volume of the mold cavity is less than 2% when the green body is ejected from the mold cavity.

2. The method for making a ceramic block of claim 1, wherein the ceramic slurry comprises yttria stabilized zirconia having a particle size of $D(50)<600$ nm.

3. The method for making a ceramic block of claim 2, wherein the ceramic slurry comprises yttria stabilized zirconia having a particle size in the range of $D(50)=100$ nm to 400 nm.

4. The method for making a ceramic block of claim 2, wherein the ceramic slurry comprises yttria stabilized zirconia having a particle size in the range of $D(50)=20$ nm to 100 nm.

5. The method for making a ceramic block of claim 1, wherein the slurry is cast under pressure, vacuum, or a combination of pressure and vacuum of between 20 psi and 900 psi.

6. The method for making a ceramic block of claim 5, wherein the slurry is cast under pressure, vacuum, or a combination of pressure and vacuum of between 150 psi and 600 psi.

7. The method for making a ceramic block of claim 1, wherein the dry release process includes applying a pneumatic pressure directly to the green body.

8. The method for making a ceramic block of claim 7, wherein the green body has a first side that abuts the porous casting substrate prior to removing the porous casting substrate from the apparatus, and the pneumatic pressure is applied to a side of the green body opposite the first side.

9. The method for making a ceramic block of claim 1, wherein the ceramic green body is ejected from the mold opening without recirculating the liquid.

10. The method for making a ceramic block of claim 1, wherein the mold cavity comprises a single piece mold.

11. The method for making a ceramic block of claim 1, wherein the mold cavity comprises a multiple piece mold.

12. The method for making a ceramic block of claim 1, wherein the porous casting substrate has a median pore diameter of less than 3 µm.

13. The method for making a ceramic block of claim 1, wherein the porous casting substrate has a median pore diameter of less than 1 µm.

14. The method for making a ceramic block of claim 1, wherein the porous casting substrate has a median pore diameter of between 0.1 µm and 0.6 µm.

15. The method for making a ceramic block of claim 1, wherein the green body has a moisture content of at least 8 wt % when it is ejected from the mold opening.

16. The method for making a ceramic block of claim 15, wherein the green body has a moisture content of at least 10 wt % when it is ejected from the mold opening.

17. The method for making a ceramic block of claim 16, wherein the green body has a moisture content of at between 10 wt % and 12 wt % when it is ejected from the mold opening.

18. The method for making a ceramic block of claim 1, wherein the difference between the volume of the green body and the volume of the mold cavity is less than 0.5% when the green body is ejected from the mold cavity.

19. The method for making a ceramic block of claim 1, wherein the porous casting substrate comprises plaster.

* * * * *